June 15, 1965  E. F. BRILL  3,189,768
MHD POWER GENERATOR
Filed March 10, 1961  2 Sheets-Sheet 1

Inventor
Edward F. Brill
by Fabian A. Bruck
Attorney

United States Patent Office 3,189,768
Patented June 15, 1965

3,189,768
MHD POWER GENERATOR
Edward F. Brill, Brookfield, Wis., assignor to Allis-Chalmers Manufacturing Company, Milwaukee, Wis.
Filed Mar. 10, 1961, Ser. No. 94,782
1 Claim. (Cl. 310—11)

This invention relates to magnetohydrodynamic (MHD) apparatus for directly converting electrically conductive fluid energy into polyphase electrical energy.

The direct interaction of a flowing electrically conductive fluid with a magnetic field to generate an electrical current is a well known fundamental law of physics: an electrically conductive fluid such as an ionized gas, moving transversely through a magnetic field, induces an electromotive force mutually transverse to the magnetic field and the fluid (gas) flow.

The prior art devices utilizing the foregoing principle required electrodes or collector plates in direct contact with the conductive fluid to receive the generated E.M.F. and current. However, in the prior art MHD devices, the ordinary operating temperatures and velocities encountered therein adversely affected the electrodes.

According to the present invention, electrodes and their losses are eliminated by utilizing an MHD induction generator and inductively converting the electrically conductive fluid energy into electrical energy. The electrically conductive fluid at an elevated temperature and a high velocity is generally an ionized gas and is passed through a traveling magnetic field where a portion of its energy is converted and inductively transferred to the stator winding, which also functions to induce the magnetic field.

The present invention utilizes the known effect of running an induction motor above synchronism. For example, if the stator of an induction motor is cut axially along its circumference and unrolled so as to be flat, and then this "flattened" stator is wound up at right angles to the previous rolling so that the coil ends come together eliminating the triangular diamond shaped coil ends, there results a series of axially spaced circumferentially wound conductors. This configuration defines a hollow cylindrical core within which a thin walled tubular duct may be disposed. The application of an A.C. power supply to the "induction motor stator windings" produces an axially traveling magnetic field; that is, the application of an A.C. current (the reactive power) causes a progressive motion of a magnetic field down the axial length of the winding. The passage of electrically conductive fluid through the duct cuts the lines of magnetic flux to inductively generate a current of active power in the stator winding.

A further advantage provided by an A.C. MHD induction generator is that the magnetic field is intense adjacent the magnetic material. This tends to focus the electrons and ions in the gas at the center of the duct, according to the principle that a nonmagnetic material such as a conductive fluid, when disposed within a circumferential magnetic field, is circumferentially repulsed from the magnetic material and, therefore, is self-centering. Thus, there is less heat transferred to the duct walls decreasing the heat loss of the fluid flow through the duct to increase the efficiency.

The apparatus of the present invention will require considerably more reactive kva's (kvar's) to produce the necessary magnetic field for generating a desired electrical output as compared to a conventional D.C. (Faraday type) MHD generator plant of like generating capacity. However, for a stated A.C. electrical output, the cost of the inversion equipment needed to invert the D.C. generated by the conventional Faraday type MHD generator is greater than the cost of the additional reactive kva's. Thus, costwise, it is advantageous to convert the energy in an ionized gas directly into A.C.

It is, therefore, an object of this invention to provide apparatus for inductively converting energy in an ionized gas flow into polyphase electrical power.

Another object of this invention is to convert energy in an ionized gas flow into electrical energy without utilizing electrodes.

Another object of this invention is to provide simple and easily assembled apparatus for inductively converting energy in an ionized gas flow into polyphase electrical energy.

Other objects and advantages will be apparent from the detailed description taken in connection with the accompanying drawings in which.

Figure 1:
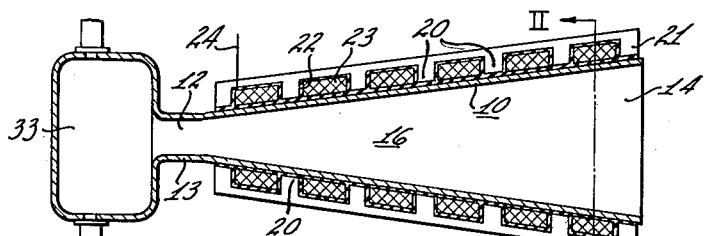
FIG. 1 is a longitudinal section of an A.C. MHD induction generator.

FIG. 1 shows a constant gas velocity A.C. MHD induction generator, utilizing an ionized gas as the conductive fluid. It is equally possible to embody the present invention in other types of A.C. MHD devices such as a constant area type, a constant pressure type, a constant density type, a constant temperature type, etc., or combinations thereof. However, for the purpose of describing the various embodiments of an A.C. MHD induction generator, the description hereinafter will be limited to a constant gas velocity A.C. MHD induction generator. It is understood that features incorporated in the constant gas velocity A.C. MHD induction generator may be incorporated in other A.C. MHD induction generators by the application of known engineering principles. For example, assuming a changing velocity MHD induction generator, the pole pitch of the generator will vary directly with changing velocity; that is, an increasing velocity will require an increasing pole pitch (assuming the density, cross sectional area, etc., remain constant).

The embodiment shown in FIG. 1 comprises a duct member 10 having an inlet 12 and outlet 14 and defines a working channel 16 therebetween. Duct member 10 is provided with an increasing cross section area throughout its axial or working length in order to maintain a constant velocity of the gas during its passage through the duct member to accommodate the expansion of the gas. To provide equalized power generation along the working channel, it is desirable to maintain the ratio of the gas velocity over the velocity of the magnetic field constant. Since the velocity of the magnetic field is dependent upon the pole spacings, a constant velocity arrangement permits utilizing equally spaced poles 20 thereby simplifying the construction of the generator. A conduit 13 connects duct member 10 to a source of ionized gas 33.

Figure 2:
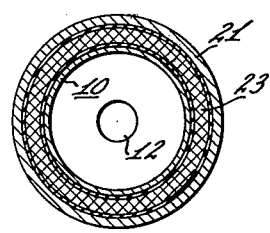
FIG. 2 is a cross sectional view of the generator shown in FIG. 1 taken along lines II—II.

A magnetic core, comprising conventional laminations 21 and windings 23, is insulated from and circumferentially surrounds the duct member 10. A plurality of axially spaced means, such as slots 22, are circumferentially defined in the laminations 21. The circumferential windings 23 are disposed in the slots 22 and are arranged to define the poles 20 corresponding to the stator poles in a conventional induction motor. As shown in FIGS. 1 and 2, each pole requires a single winding disposed in a single slot. However, a plurality of coils and slots may be utilized per pole, in which case the coils in each pole are series connected. It is only necessary that the pole construction produce the necessary magnetic field.

Figure 3:
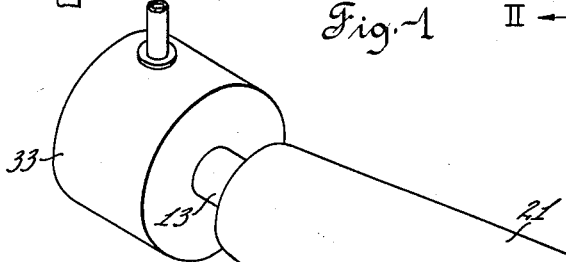
FIG. 3 is a perspective view of the generator shown in FIG. 1.
Figure 7:
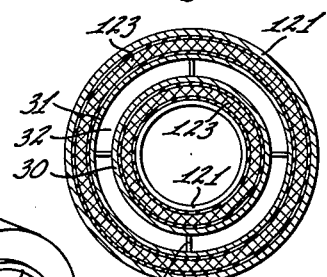
FIG. 7 is a cross sectional view of the generator shown in FIG. 6 taken along lines VII—VII.
Figure 8:
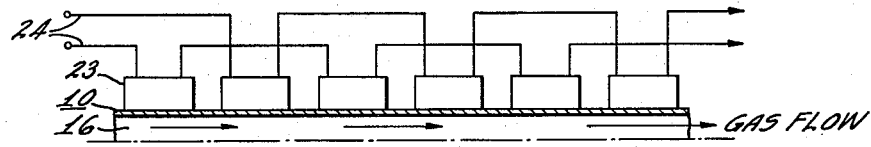
FIGS. 8 through 11 are schematic diagrams showing the electrical conection to a single and three phase power source for the various embodiments of the present invention.
Figure 9:
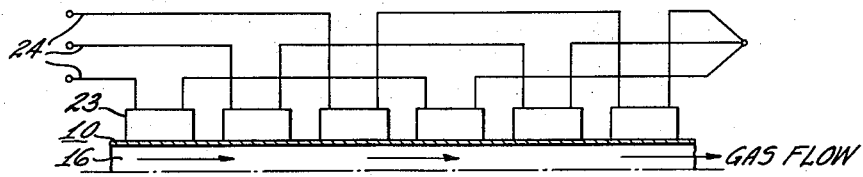

The windings 23 are connected to an alternating excitation current source (A.C. line 24) and provide a traveling magnetic field. When polyphase current is utilized as the excitation, the windings associated with adjacent poles 20 are connected to different phases and suitably arranged to provide a traveling magnetic field having an axial velocity less than the axial velocity of the ionized gas flow. Schematic examples of single and three phase wiring diagrams illustrating the electrical connections for the embodiment shown in FIGS. 1 through 3 are shown in FIGS. 8 and 9, respectively. The lines of flux produced by the magnetic field around each coil are toroidal in pattern and in part transverse to the duct axis. That is to say, the flux pattern around each coil is toroidal.

It may be necessary to cool the magnetic core to prevent the temperature of the magnetic core from exceeding a temperature at which the core iron loses its magnetic properties (the Curie point). If necessary, cooling means may be incorporated in the magnetic core to maintain the temperature of the core iron below its Curie point, and also lower the conductor temperature thereby decreasing $I^2R$ losses.

As previously stated, the operation of the present invention is comparable to the operation of an induction motor above its synchronous speed where it operates as a generator to deliver active power back into the lines that supply the excitation (reactive) power. Thus, the energy in ionized gas is converted and inductively fed into the power supply lines.

Among other things, the voltage generated by the MHD induction generator is a function of the number of turns in circumferential winding 23. In a constant velocity MHD induction generator the winding diameters will vary as a function of the duct member length; i.e., the winding diameters will increase as a function of the increasing diameter of outwardly flaring duct member 10.

As shown in the drawings, a combustion chamber is utilized as an ionized gas source 33. Utilizing known engineering principles, a combustion chamber may be designed to "exhaust" 1.5 million pounds per hour of gaseous combustion products having a velocity and temperature in the neighborhood of 1800 ft./sec. and 4800° F., respectively, and a pressure sufficiently high to maintain a substantially constant velocity of the gases passing through duct member 10. It is unlikely that the gases will have sufficient thermal ionization at the chamber temperature. To provide adequate ionization, an easily ionizable material, generally an alkali compound such as the alkali compounds of cesium or potassium, etc., is introduced into the gas flow to increase the ionization which, for the stated purposes, is generally considered to be in excess of 0.1 percent.

Assuming that the combustion gases passing through the duct incur a pressure drop of five atmospheres, an enthalpy drop of 450 to 550 B.t.u.'s per pound of combustion gases and have an axial gas velocity 125 percent of the axial velocity of the traveling magnetic field, a sixty cycle, two pole generator requires a pole pitch of approximately twelve feet. Assuming further that six poles are utilized (although only a single pole pair is shown in the drawings), that the magnetic field has an intensity of approximately 100,000 lines per square inch and that no heat is lost to the duct walls, the converted energy will approximate 450 to 550 kw. per pound of combustion gas flow per second, or approximately 180 to 220 megawatts for 400 pounds per second, or 1,440,000 pounds per hour of combustion gas flow.

An intense field is required for an MHD generator in order to minimize the size thereof thereby reducing the wall area and the resultant heat losses. However, the magnetic field applied is a limitation of the possible power output and, therefore, may vary.

Figure 4:
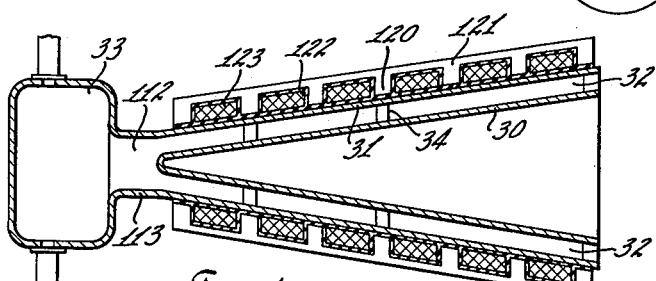
FIGS. 4, 5 and 6 show modifications of the MHD generator shown in FIG. 1.
Figure 6:
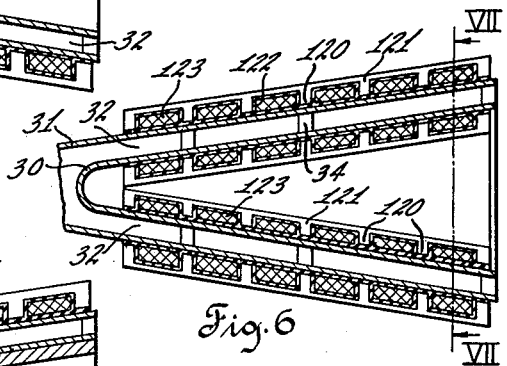
Figure 5:
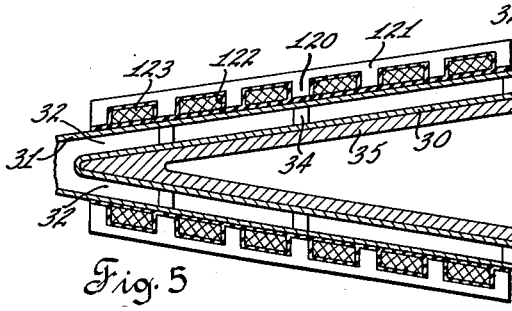

FIG. 4 shows an embodiment of the present invention utilizing inner 30 and outer 31 hollow conical members coaxially nested to define an annular working channel 32 therebetween. A working channel inlet 112 is defined at the apex portions of the conical members 30, 31 and is connected to a source of ionized gas 33. Working channel inlet 112 may be circular as shown or it may be annular (not shown). In either instance it is preferable to provide a smooth aerodynamic connection 113 between gas source 33 and working channel 32 to reduce turbulence of the gas as it enters working channel 32. Inner conical member 30 is spaced from outer conical member 31 by suitable means such as struts 34. Inner conical member 30, being disposed in the high temperature area of the MHD generator, is preferably fabricated out of heat resistant material. Further, cooling means (not shown) may be utilized if required to maintain the operating temperature of the generator structure at a safe temperature. The arrangement shown in FIGS. 4, 5 and 6 provides an increased cross sectional area of the working channel so as to maintain a constant gas velocity and a gap spacing that remains relatively constant. Thus, the traveling magnetic field impressed across the working channel along its axial length remains substantially uniform thereby providing a substantially constant voltage generation along its length.

Figure 10:
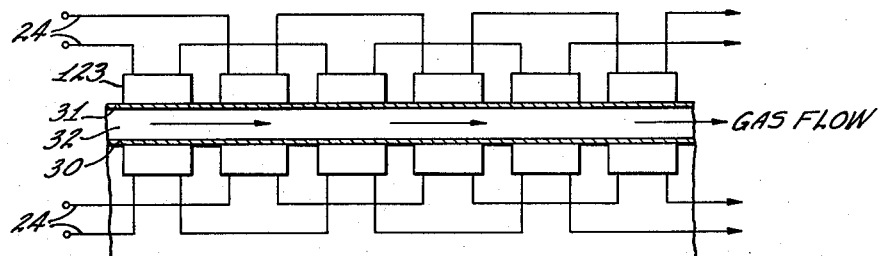
Figure 11:
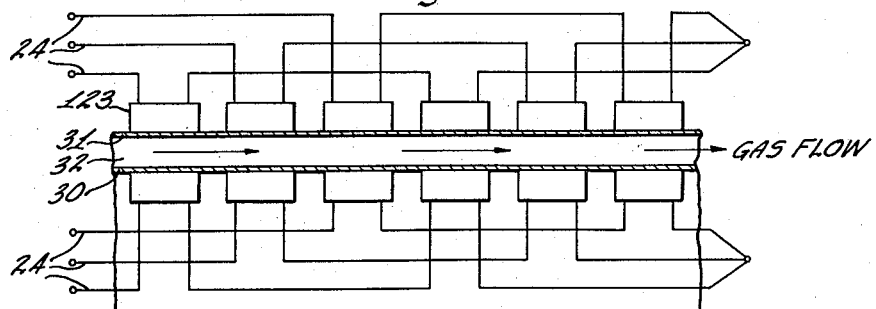

The preferred arrangement of an MHD induction generator provides an improved path for the magnetic flux by disposing a core of magnetic material 35, complementary windings, or both within the hollow portion of inner conical member 30. The embodiments of this invention incorporating these features are shown in FIGS. 5 and 6, respectively. The electrical connections for connecting the embodiment shown in FIG. 6 to a single and to a three phase power source are shown in FIGS. 10 and 11, respectively.

Although various embodiments of the present invention have been described in this specification, it will be obvious to those skilled in the art that other embodiments of this invention are possible without departing from the scope and intent of coverage set forth in the appended claim.

What is claimed is:

Apparatus for inductively converting energy in ionized gas into electrical energy comprising: a pressurized source of ionized gas; inner and outer hollow conical members coaxially nested and spaced a relatively constant distance from each other to define an annular passage therebetween, said passage having an increasing cross sectional area to maintain gas velocity constant, said annular passage being connected to said source of ionized gas; and means to provide a traveling magnetic field along said annular passage at a velocity less than the velocity of said ionized gas flowing through said passage, said means simultaneously inductively receiving said generated electrical energy, said means comprising a first magnetizable core along the inner periphery of said inner coaxial member and a second magnetizable core along the outer periphery of said outer coaxial member, and further comprising first windings spaced from each other along said first magnetizable core to provide a constant pole pitch and second windings disposed along said second magnetizable core in registry with said first windings.

References Cited by the Examiner

UNITED STATES PATENTS

| | | | |
|---|---|---|---|
| 1,912,167 | 5/33 | Anderson | 310—13 |
| 3,102,224 | 8/63 | Maeder | 322—47 |

FOREIGN PATENTS 738,511  10/55  Great Britain.

OTHER REFERENCES

Magnetohydrodynamic Generators, by WAY, published in Westinghouse Engineer, July 1960, pages 105 to 107.

M.H.D.—Future Power Process?, Power (Design and Application Section), November 1959, pp. 62–65.

MILTON O. HIRSHFIELD, *Primary Examiner.*

DAVID X. SLINEY, *Examiner.*